Aug. 17, 1948.  W. A. WILLIAMS  2,447,300
GRASP DEVICE

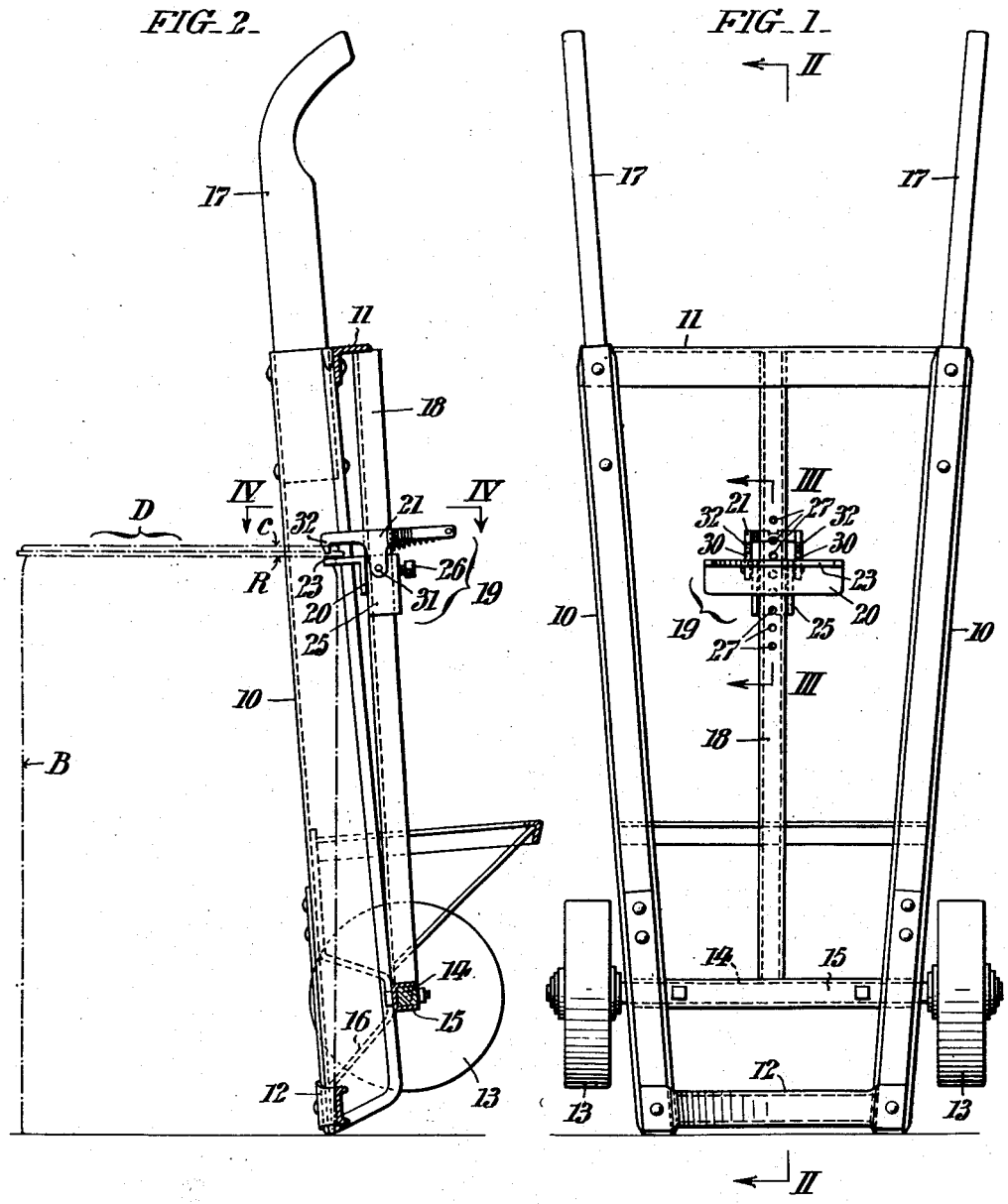

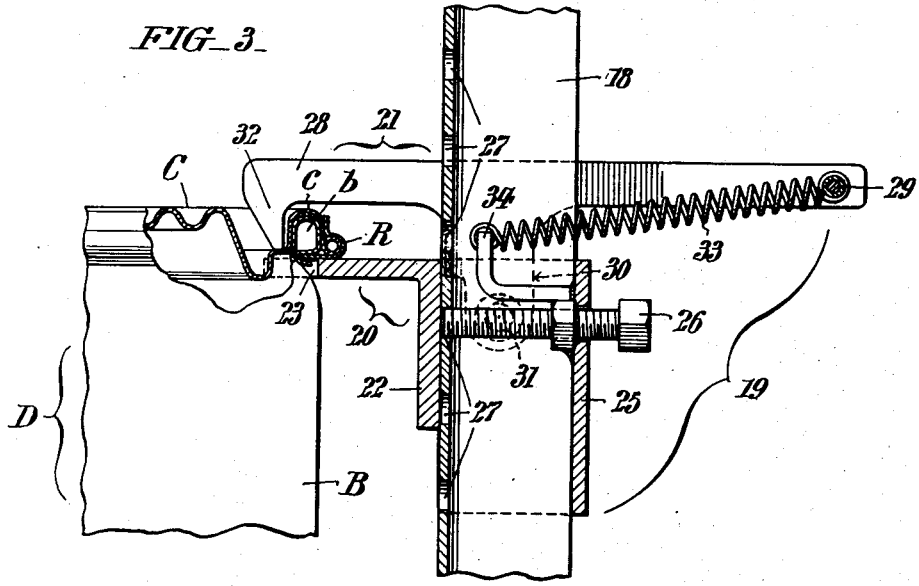
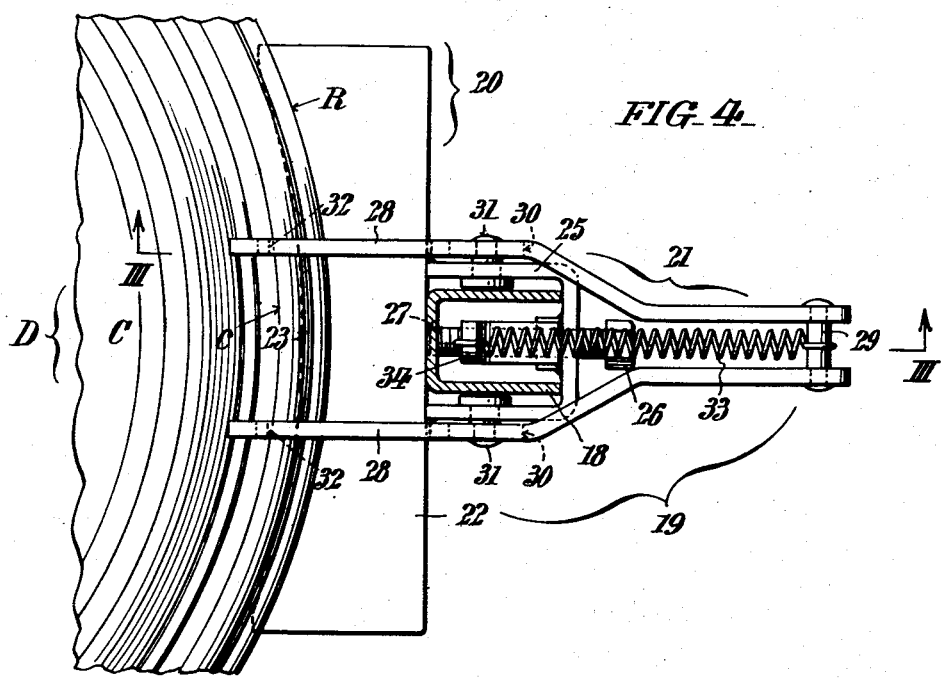

Filed Jan. 16, 1946  3 Sheets-Sheet 3

FIG-5

INVENTOR:
William A. Williams,
BY Paul & Paul
ATTORNEYS.

WITNESSES
Hubert Fuchs
Thomas W. Kerr, Jr.

Patented Aug. 17, 1948

2,447,300

UNITED STATES PATENT OFFICE 2,447,300

GRASP DEVICE

William A. Williams, Philadelphia, Pa., assignor to The American Pulley Company, Philadelphia, Pa., a corporation of Pennsylvania Application January 16, 1946, Serial No. 641,441

4 Claims. (Cl. 214—65.4)

This invention relates to grasp devices useful more especially in connection with apparatus such as hand trucks and powered transporting elevator trucks, in handling container drums and the like:

The chief aim of my invention is to provide a device of the kind referred to which is of simple and inexpensive construction, and capable, as the truck with which it is associated is maneuvered into position to receive an upright drum, of automatically grasping the laterally-projecting top flange or chime of such drum and thereby pick up the drum and thereafter securely hold it on the truck while it is being transported.

In connection with a clamp device having the above attributes and intended for use with a hand truck, it is a further aim of my invention to provide for its adjustment longitudinally of the truck so that the truck may be adapted for handling drums of different heights.

Other objects and attendant advantages will appear from the following detailed description of the attached drawings, wherein Fig. 1 is a view in front elevation of a hand truck with an associated grasp device conveniently embodying my invention.

Fig. 2 is a vertical section taken as indicated by the angled arrows II—II in Fig. 1 showing how the hand truck is maneuvered into position to pick up an upright container drum with the aid of my improved grasp device.

Figs. 3 and 4 are detail sections drawn to a larger scale and taken as respectively indicated by the arrows III—III and IV—IV in Figs. 1 and 2; and, Fig. 5 is a view in side elevation of a powered elevating and transporting truck likewise provided with a grasp device of my invention.

Referring first more particularly to Figs. 1 and 2 of these illustrations, the hand truck there shown is generally of well known construction in that it has a frame with hollow side bars 10 which are joined at their opposite ends by cross members 11 and 12, the latter of these cross members being concaved to approximately conform to the curvature of drums, such as the one indicated at D in Fig. 2, to be transported. The wheels 13 of the truck are rotatable about the cylindric ends of an axle 14 lodged in a transverse channel bar 15 which is secured to bracket elements 16 pendent from the side bars 10 adjacent the nose end of the truck. At the opposite end, the truck has the usual handles 17 whereof the shanks are riveted fast within the hollows of the side bars 10. In accordance with my invention the truck frame is provided for a purpose presently explained, with a central longitudinal member 18 of channel section whereof the opposite ends are fixedly connected respectively to the cross member 11 and to the axle channel 15.

The drum D which it is desired to transport is of a type having a cylindric body B (Fig. 3) with a substantially-square section outwardly-projecting flange or chime b, peripherally of its top, and a cover C with an upwardly projecting circumferential ridge embossment c adapted to fit down over said chime, the cover being held in place by a clamp ring R.

The grasp device with which the present invention is more especially concerned is comprehensively designated 19, and as shown, comprises a stop member 20 and a cooperative latch element 21. As seen to the best advantage in Figs. 3 and 4 the stop member consists of an angle piece 22 whereof the horizontal flange is concaved as at 23 to conform to the curvature of the drum body and to serve as a ledge for engaging beneath the chime b of said drum; and a channel piece 25 which is welded or otherwise rigidly attached to the back of said angular piece at the center and slidingly engages over the central longitudinal 18 of the truck frame. In order that the device may be adjusted along the longitudinal 18 to suit the height of the drum D, I have provided it with a set screw 26 which is selectively engageable with apertures 27 serially arranged in said longitudinal.

The latch element 21 is in the form of a yoke with side arms 28 connected at their rear ends, by a stud rivet 29. Fixed in ears 30 pendent from the side arms 28 intermediate their ends are headed pivot studs 31 whereof the shanks engage aligned holes respectively in opposite sides of the portion 25 of the stop member 20. At the front ends of its side arms 28 the latch element is provided with hooks 32 for engaging the circumferential ridge embossment c of the cover C rearward of the chime b shown in Fig. 3, said hooks being beveled as shown for capacity to ride over said embossment in a manner presently explained. A coiled spring 33 in tension between the rivet 29 and an anchorage lug 34 welded fast within the sleeve portion 25 of the stop member 20, serves to yieldingly maintain the element 21 in latching position.

In use, the hand truck is brought up to the upright drum D and swung up about its toe end to vertical position as in Fig. 2, with attendant engagement of the stop member 20 of the grasp device beneath the peripheral flange or chime b of the drum, and overriding of the cover embossment c by the beveled hook ends of the spring-biased latch element 21 into final latching position. The grasp device thereafter maintains a firm hold on the drum D as the truck is swung back to wheeling position, with the drum supported by the side bars 10 and cross member 12 of the truck frame. In unloading the truck after the drum has been transported to the desired location, it is swung up to vertical position likewise as in Fig. 2 to deposit the drum upright. With this accomplished, the rearwardly-projecting portion of the latch element 21 is depressed in opposition to the spring 33 and its hook ends 32 thereby disengaged from the chime of the drum, and the truck thereupon withdrawn. To adapt the truck for manipulation of drums of other heights, the grasp device is simply adjusted as may be required along the central longitudinal 18 of the truck frame and thereafter fixed by engaging the set screw 26 with the proper hole 27 in said longitudinal.

At Fig. 5, the grasp device is secured with capacity for adjustment to a post 18a on the elevator 40 of a powered four wheel elevating and transporting truck 41 which has a platform at 42 for an operator. Through suitable mechanism (not shown) controllable by means of a hand lever at 43, the elevator 40 can be raised or lowered in a well known manner. In the use of the truck of Fig. 5, the elevator 46 is lowered to place the grasp device 19 at the proper height for engagement with the chime of the drum which is to be picked up. Thereupon the truck is advanced toward the drum to effect automatic engagement of the grasp device with the drum in the same manner as described hereinbefore in connection with the hand truck. The elevator 40 is next actuated to lift the drum as shown in Fig. 5, and the truck operated to transport the drum to the desired location. Then the elevator may be lowered to deposit the drum on the floor, or further raised if the drum is to be stacked upon another previously transported. After deposit of the drum in either case, the latch element 21 of the grasp device is tripped for detachment from such drum. To facilitate this, I have in this instance connected the latch element 21 by a pull cord 45 to another hand lever 46 convenient of access to the truck operator at the platform 42.

Having thus described my invention, I claim:

1. A grasp device useful in connection with a transporting truck in picking up container drums and the like provided with outwardly-projecting flanges or chimes circumferentially of their tops, said device comprising a stop member adapted to be affixed to a vertical part of the truck and having a ledge for engaging beneath the chime of a drum of the aforesaid type in upright position; and an associated relatively movable latch element with a hook having a beveled cam end for capacity to ride over the chime and automatically engage it at the back as the truck is brought to the drum from the side to pick it up.

2. A grasp device characterized as in claim 1, wherein the latch element is pivotally connected to the stop member, and wherein a biasing spring is arranged to urge the hook of said element toward the ledge of the stop member.

3. A grasp device characterized as in claim 1, wherein the stop member is in the form of a slide which is adjustable up and down on the vertical part of the truck for adaptation of the truck to handle drums of different heights.

4. A grasp device for use in connection with a powered transporting truck having an elevator and a seat for an operator, in picking up container drums having outwardly projecting flanges or chimes circumferentially of their tops, said device comprising a stop member adapted to be affixed to the elevator and having a ledge for engaging beneath the chime of a drum of the aforesaid type in upright position; an associated relatively movable latch element with a hook having a beveled cam end for capacity to ride over the chime and automatically engage it at the back as the truck is brought up to the drum from the side to pick it up; and control means accessible from the station of the operator on the truck for actuating the latch member to release the drum after it has been transported to the desired location.

WILLIAM A. WILLIAMS.

REFERENCES CITED

The following references are of record in the file of this patent:

UNITED STATES PATENTS

| Number | Name | Date |
|---|---|---|
| 1,929,447 | Remde | Oct. 10, 1933 |
| 2,160,041 | Sooter | May 30, 1939 |
| 2,196,822 | Bissell | Apr. 9, 1940 |
| 2,250,475 | Ernst | July 29, 1941 |
| 2,272,447 | Traxel | Feb. 10, 1942 |
| 2,304,649 | McDaniels | Dec. 8, 1942 |
| 2,319,456 | Hazen | May 18, 1943 |
| 2,346,649 | Bilek et al. | Apr. 18, 1944 |
| 2,360,858 | Ernst | Oct. 24, 1944 |
| 2,364,493 | Ulinski | Dec. 5, 1944 |